(12) United States Patent
Inouye et al.

(10) Patent No.: US 7,911,633 B2
(45) Date of Patent: Mar. 22, 2011

(54) EXTENDING THE FOREIGN DEVICE INTERFACE FOR MFDS USING SNMP OR OTHER NETWORK PROTOCOLS

(75) Inventors: Steven H. Inouye, Cypress, CA (US); Christopher R. Klapp, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1127 days.

(21) Appl. No.: 11/169,877

(22) Filed: Jun. 28, 2005

(65) Prior Publication Data

US 2006/0290973 A1 Dec. 28, 2006

(51) Int. Cl.
*G06F 3/12* (2006.01)

(52) U.S. Cl. ........ 358/1.15; 235/381; 358/1.13; 705/32; 705/34; 705/400; 726/4

(58) Field of Classification Search .................. 358/1.15; 705/34, 35, 400; 709/224
See application file for complete search history.

(56) References Cited

U.S. PATENT DOCUMENTS

| | | | | |
|---|---|---|---|---|
| 5,491,326 | A * | 2/1996 | Marceau et al. | 235/381 |
| 6,216,113 | B1 * | 4/2001 | Aikens et al. | 705/34 |
| 2002/0065824 | A1 * | 5/2002 | Rosenfelt et al. | 707/9 |
| 2002/0113993 | A1 * | 8/2002 | Reddy | 358/1.15 |
| 2003/0154147 | A1 * | 8/2003 | Parry | 705/32 |
| 2004/0130744 | A1 * | 7/2004 | Wu et al. | 358/1.15 |

OTHER PUBLICATIONS

The Seybold Report on Publishing Systems, Mar. 26, 2001, p. 22, "T/R Systems adds printer discovery".*
International Computer Science Institute MIB Index, downloaded from Internet Archive via URL: <http://web.archive.org/web/20020414171526/http://www.icir.org/fenner/mibs/mib-index.html>, dated Apr. 14, 2002; selected excerpts.*
Job Monitoring MIB RFC2707, downloaded from the Internet Archive via URL: <http://web.archive.org/web/20020523075312/www.icir.org/fenner/mibs/extracted/Job-Monitoring-MIB-rfc2707.txt>, dated Apr. 23, 2002.*

* cited by examiner

*Primary Examiner* — King Y Poon
*Assistant Examiner* — David S Cammack
(74) *Attorney, Agent, or Firm* — Kermit D. Lopez; Luis M. Ortiz; Ortiz & Lopez, PLLC

(57) ABSTRACT

Employing an extended network interface and system architecture comprising operatively connecting a Foreign Device Interface (FDI) device and Multi-Function Device (MFD) via a network-based communication mechanism, configuring the FDI device as either a vend card device and/or accounting device, monitoring job-level accounting information or additional resource usage information from the MFD, synthesizing multiple information sources from at least one function performed by the MFD, and extending the functionality of said network interface and system architecture.

4 Claims, 6 Drawing Sheets

EXTENDING THE FOREIGN DEVICE INTERFACE FOR MFDS USING SNMP OR OTHER NETWORK PROTOCOLS

TECHNICAL FIELD

Embodiments are generally related to extended network interfaces, system architectures, and methods. Embodiments are further related to Foreign Device Interfaces (FDI) and Multi-Function Devices (MFD). Embodiments are additionally related to Simple Network Management Protocol (SNMP) Management Information Databases (MIBs) and other network protocols.

BACKGROUND

Foreign Device Interface (FDI) devices such as accounting terminals and vend card devices were introduced on copiers many years ago. At that time, FDI devices were only used to control access to copying machines and to gather copy-related accounting data. FDI devices were additionally used to provide point of operation vending services for photocopiers.

Although print, scan, and faxing services have been added to copiers over the years, the basic interface to these FDI devices has not changed. Consequently, FDI devices have limited capability to effectively track non-copy jobs on Multi-Function Devices (MFDs). Thus, for example, FDI devices cannot charge different rates for print versus scan jobs and do not adequately support the job based charges that are required for scan jobs.

Furthermore, due to the limited information that can be passed to FDI devices through this interface, there are limited opportunities to charge premiums for job execution based upon the consumables used on the job (e.g., transparencies, label stock) or job programming attributes (e.g., n-up).

In the past, certain classes of jobs could not be accounted for (e.g., scan jobs) and the functionality of hardware signals on the FDI had to be modified based on the functionality available on the device (e.g., the large/small paper signal would be used for color or black & white impression).

SUMMARY

According to aspects illustrated herein, there is provided an extended network interface and system architecture comprising a Foreign Device Interface (FDI) device and a Multi-Function Device (MFD) operatively connected to said FDI device by a network-based communication mechanism.

In accordance with another feature, there is provided an extended network interface system comprising a Foreign Device Interface (FDI) device and a Multi-Function Device (MFD) operatively connected to said FDI device by a network-based communication mechanism which utilizes Simple Network Management Protocol (SNMP) Management Information Databases (MIBs).

Other disclosed features of the embodiments include employing an extended network interface and system architecture comprising operatively connecting a Foreign Device Interface (FDI) device and Multi-Function Device (MFD) via a network-based communication mechanism, configuring the FDI device as either a vend card device and/or accounting device, monitoring job-level accounting information or additional resource usage information from the MFD, synthesizing multiple information sources from at least one function performed by the MFD, and extending the functionality of said network interface and system architecture.

DETAILED DESCRIPTION

Features of the present embodiment extend existing Foreign Device Interfaces (FDI) device through the use of network communication protocols and data structures such as Simple Network Management Protocol (SNMP) Management Information Databases (MIBs). MIBs on Multi-Function Devices (MFD) often contain two types of accounting information that is useful: e.g., job accounting information for jobs in progress and jobs completed on the device and billing meter and usage meter values.

Figure 1:
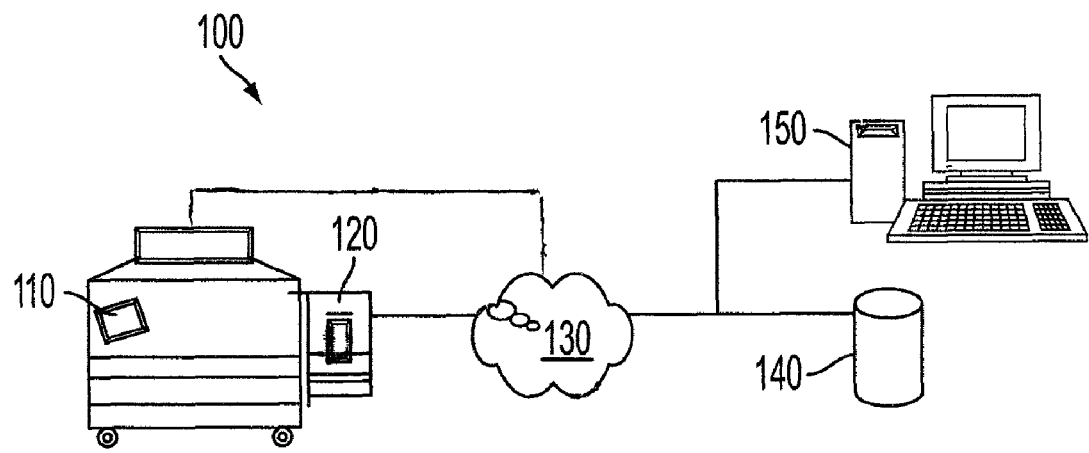
FIG. 1 illustrates an extended Foreign Device Interface (FDI) device operatively connected to a Multi-Function Device (MFD) which uses a network-based communication mechanism in accordance with an embodiment.

Referring to FIG. 1, a system architecture 100 in accordance with features of the embodiment is illustrated wherein an extended FDI device operatively is connected to a MFD 110 which uses network-based communications 130. A user first logs into the FDI device 120. After the FDI device 120 retrieves usage and/or billing meter values from the MFD 110, the user is granted access to the MFD 110. The communication between the MFD 110 and FDI device 120 is accomplished via the network-based communications 130, such as SNMP MIBs. Once the user programs the MFD 110 with the desired job, the MFD 110 processes the job and updates the billing and/or usage meters. After the user logs out of the FDI device 120, the FDI device 120 retrieves the billing and/or usage meter changes. The FDI device 120 then updates its accounting database 140 and disables access to the MFD 110. Account information can be retrieved through authorized workstations 150 to manage and/or monitor job usage levels.

Figure 2:
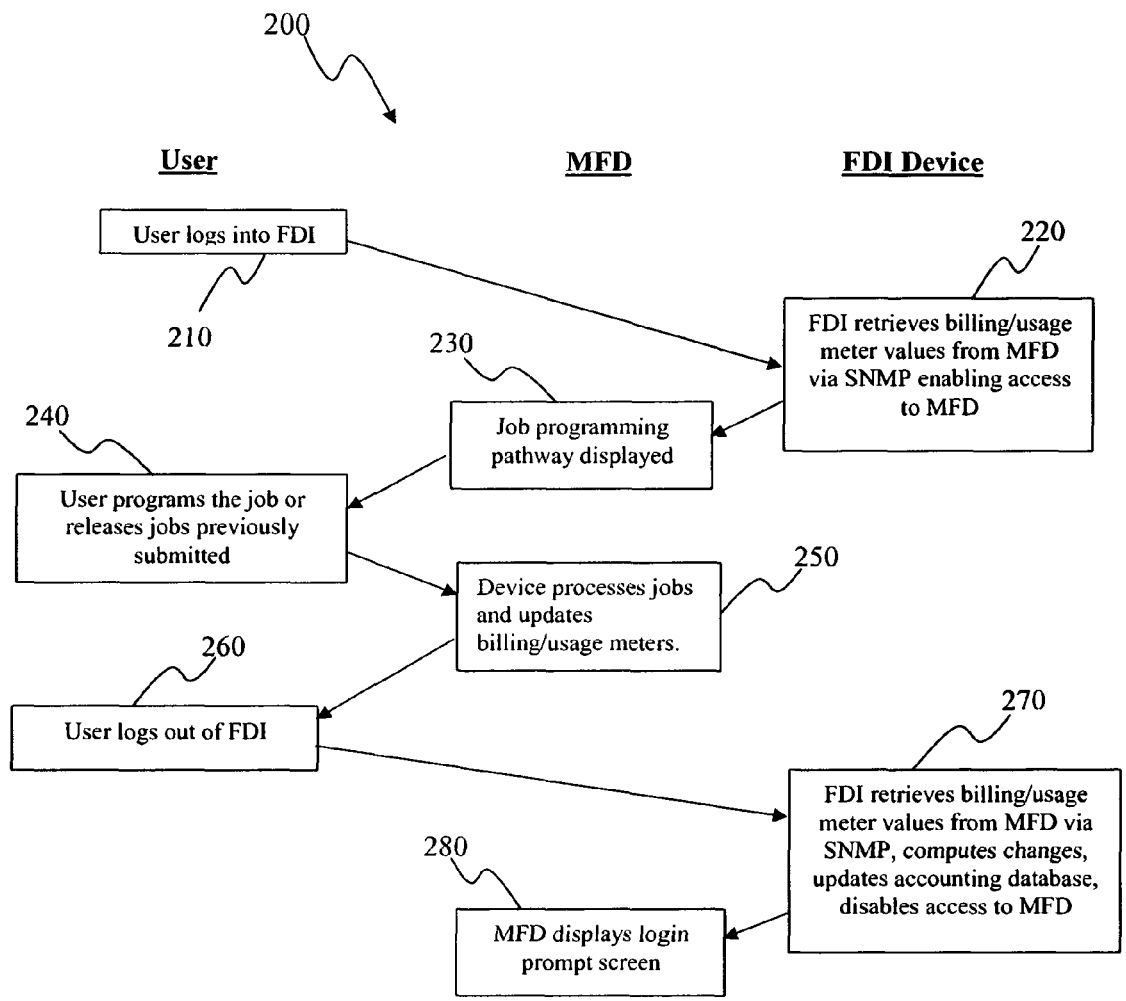
FIG. 2 depicts a diagram illustrating the control flow process employed in an extended FDI for use with a MFD in accordance with an embodiment.

Referring to FIG. 2, a diagram 200 illustrating the control flow process employed given an extended FDI for use with a MFD in accordance with an embodiment is shown. As shown in block 210, a user first logs into the FDI device (e.g. accounting terminal or vend card device). The FDI device retrieves the billing and/or usage meter values from the MFD via a network-based communication mechanism, such as SNMP MIBs, and enables access to the MFD as shown in block 220. The job programming pathway is displayed as shown in block 230. The user then programs the job, or releases jobs that were previously submitted as shown in block 240. The MFD then processes the jobs and updates the billing and/or usage meters as shown in block 250. The user can then log out of the FDI device as shown in block 260. After user log out, the FDI device retrieves the billing and/or usage meter values from the MFD via a network-based communication mechanism, such as SNMP MIBs, and computes the change in values. The FDI device updates its accounting database and disables access to the MFD as shown in block 270. Once disabled, the MFD displays a login prompt screen, as shown in block 280.

The type of information used and how it is used depends on what function the FDI device is performing. For an accounting terminal such as those used for legal market applications, the FDI device is usually only interested in how many pages of copy, print, scan, or fax jobs were processed during the session. In this case, the FDI device could simply retrieve the billing meter values at login and logout to determine the number of pages of each type of job that was produced during the login session.

For FDI accounting devices that need job-level accounting information or need more detailed resource usage information, that information is available in the MFD's Job Monitoring MIB. The Job Monitoring MIB provides accounting information for jobs in progress and jobs completed on the device. As the job is being processed, it updates MIB objects that describe the resources that are required for the job to be completed. For example, for print and copy jobs, this data would include the name of the job, the submitter of the job, the number of copies requested, number of sheets required, and number of impressions in the job. For scan jobs, this data would include the number of pages scanned and the number of destination filing locations. When the job is completed, an analogous set of MIB objects would be updated to define the actual resources used for the job. All jobs also include the time of day the job started and completed, and the completion status (e.g., successful, deleted, unsuccessful).

Figure 3:
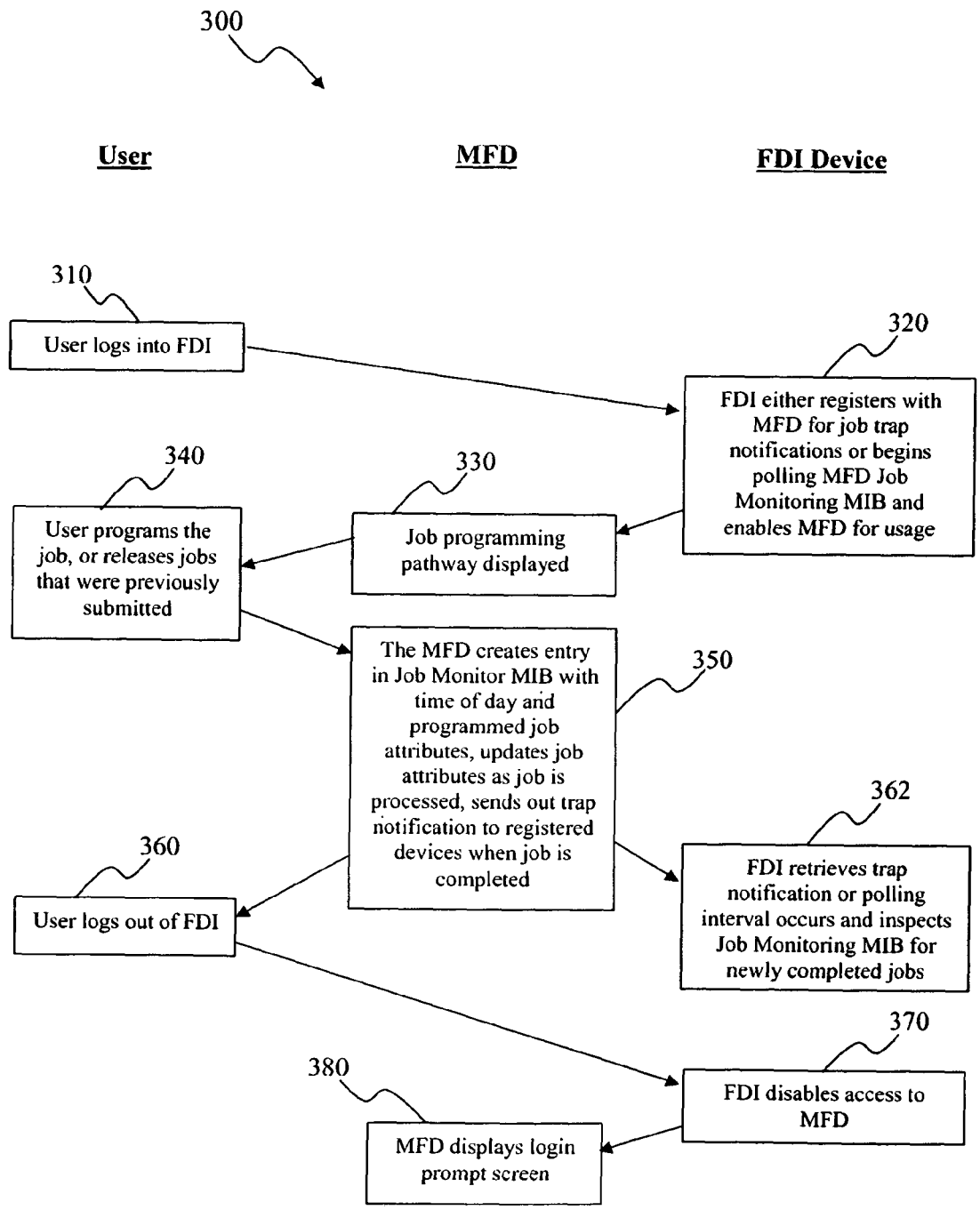
FIG. 3 depicts a diagram illustrating the control flow process employed between the user, FDI device, and MFD for a typical job in accordance with an embodiment.

Referring to FIG. 3, a diagram illustrating the control flow process 300 employed between the user, FDI device, and MFD for a typical job in accordance with an embodiment is shown. A FDI accounting device could retrieve job-level accounting information for a login session in the following manner. As shown in block 310, a user first logs into the FDI device. The FDI device then either registers for job trap notifications or periodically polls the Job Monitoring MIB on the MFD looking for jobs that have been recently completed as shown in block 320. The job programming pathway is displayed on the MFD as shown in block 330. The user then programs the job, or releases jobs that were previously submitted as shown in block 340. The MFD creates an entry in the Job Monitoring MIB with time of day and programmed job attributes and updates the job attributes as the job is processed as shown in block 350, wherein as the job is completed, the MFD sends out a trap notification to registered devices. The user can then log out of the FDI device, as shown in block 360. As shown in block 362, the FDI device retrieves the trap notification or the polling interval occurs and inspects the Job Monitoring MIB for newly completed jobs. If one is found, the Job Monitoring MIB collects the accounting information for the job and charges the user accordingly. After the user logs out, the FDI device disables access to the MFD as shown in block 370. Once disabled, the MFD displays a login prompt screen as shown in block 380.

Some FDI devices, such as vend card devices or accounting systems that need to enforce account limits, need to know how much a job will cost to process prior to printing or file transfer and only allow printing or file transfer to begin when there are sufficient funds in the account. This information is available in the Job Monitoring MIB and can be controlled through a combination of MFD behavior and the Job Management MIB.

As stated previously, the Job Monitoring MIB contains accounting information for jobs that are in progress and jobs that are completed. The MIB contains sufficient information to compute the anticipated cost for any impression and/or page-based FDI device. Additional information could also be made available through the MIB to enable charge schemes based on additional criteria such as media type, color and/or size.

To prevent jobs from being printed or filed until the account can be validated, the MFD would implement the following behavior when the appropriate accounting option was installed:

Walkup jobs (i.e., copy, scan, fax) are placed on hold after job programming and scanning is completed, but prior to printing or file transfer.

Print jobs are automatically placed on hold upon receipt.

The system acts upon the job queue management operations conveyed by the FDI device through the MIB.

Jobs that are released are processed to completion. Walkup jobs that are placed on an accounting resource hold by the FDI device may cause a fault screen to appear instructing the user in how to resolve the hold (e.g., deposit more money). Once the cost of the job is determined and the availability of funds confirmed, the FDI device either releases the job for printing/filing or places the job on accounting resource hold. The FDI device may also delete the job if the user is not authorized to initiate this type of job. These operations can be accomplished by the FDI device through the Job Management MIB. The Job Management MIB allows external devices to perform queue management operations on the device.

Figure 4:
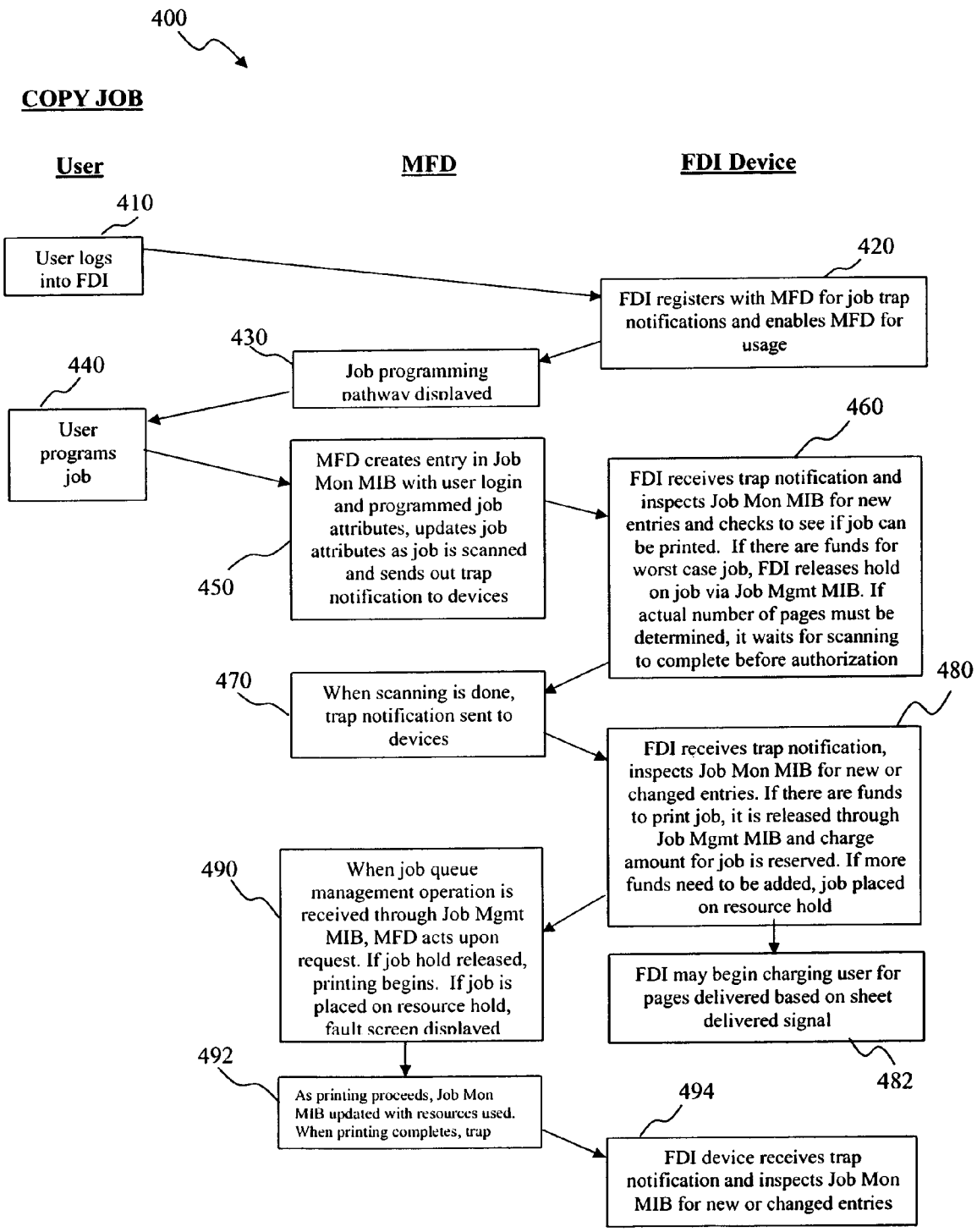
FIG. 4 depicts a diagram illustrating the control flow process employed between the user, FDI device, and MFD for a typical copy job in accordance with an embodiment.
Figure 5:
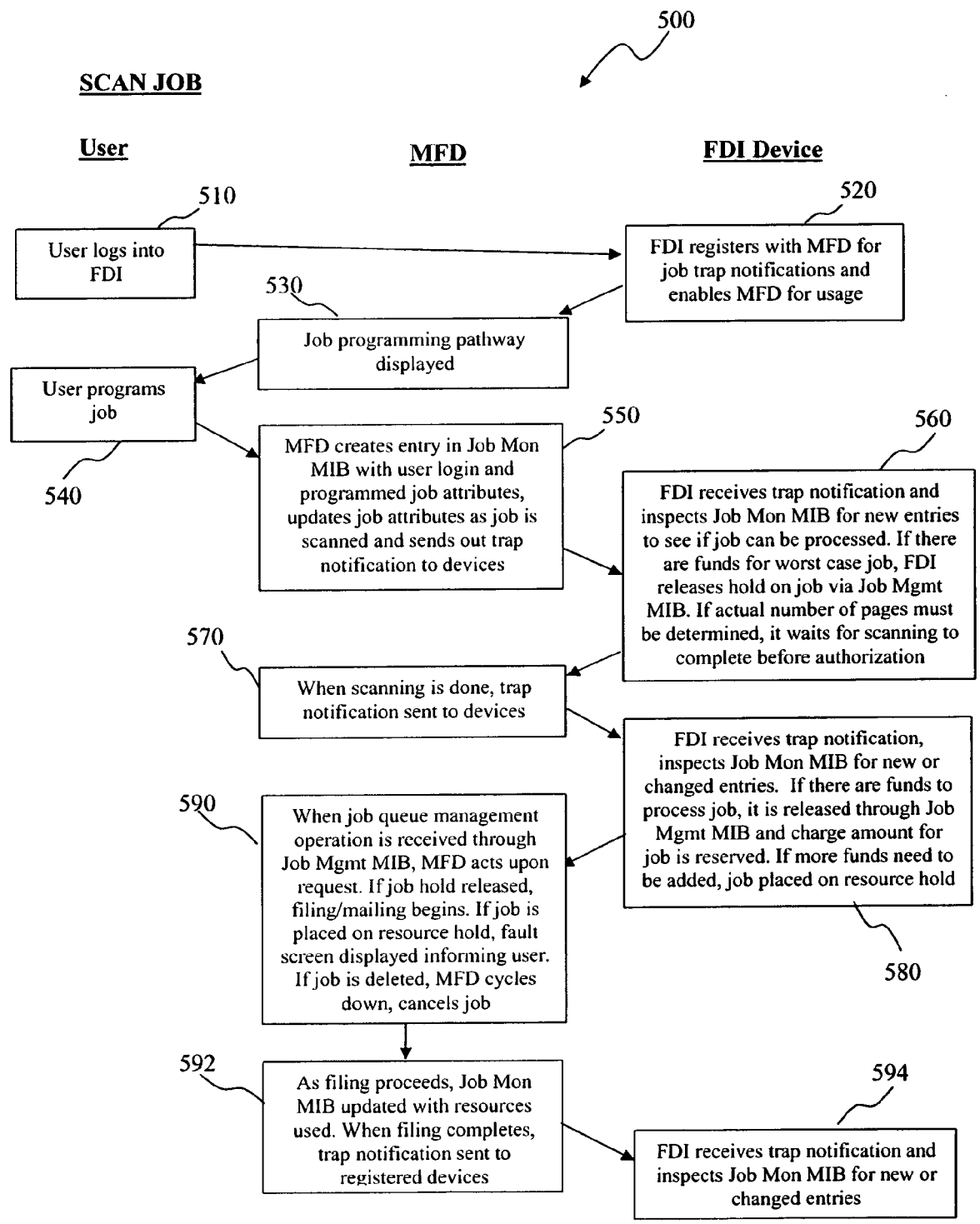
FIG. 5 depicts a diagram illustrating the control flow process employed between the user, FDI device, and MFD for a typical scan job in accordance with an embodiment.
Figure 6:
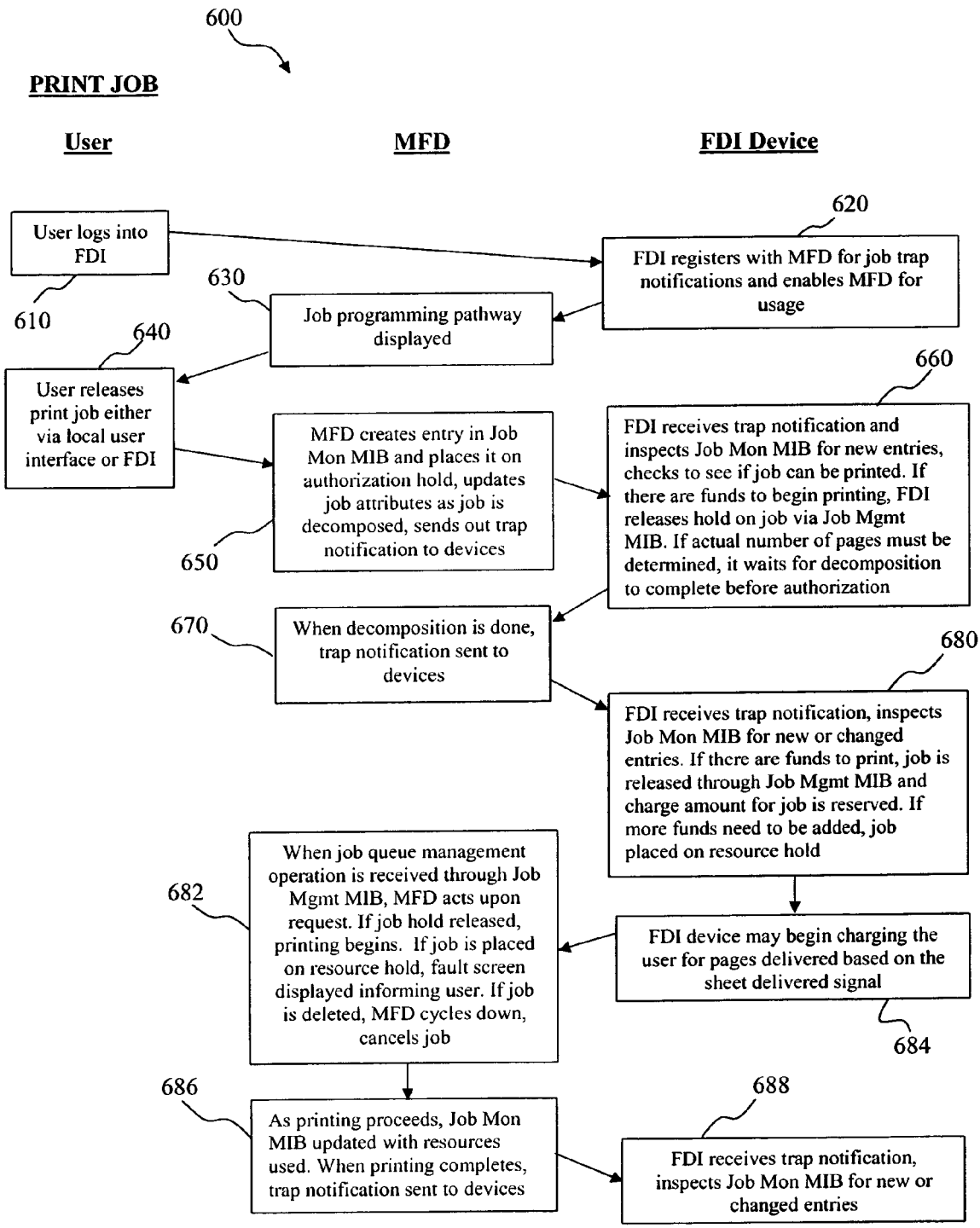
FIG. 6 depicts a diagram illustrating the control flow process employed between the user, FDI device, and MFD for a typical print job in accordance with an embodiment.

The flow diagrams in FIGS. 4-6 show the control flow between the user, FDI device, and MFD for various types of jobs under the above described scheme. Traps are used to notify the FDI device of any new jobs or changes in state of in process jobs.

FIG. 4 depicts a flow diagram 400 illustrating the control flow process employed between the user, FDI device, and MFD for a typical copy job in accordance with an embodiment. As shown in block 410, a user first logs into the FDI device. The FDI device then registers with the MFD for job trap notifications and also enables the MFD for usage as shown in block 420. The job programming pathway is displayed on the MFD as shown in block 430. The user programs the job, loads the originals, and presses the start button to initiate the job as shown in block 440. The MFD then creates an entry in the Job Monitoring MIB with the user login and programmed job attributes, and places it on accounting authorization hold as shown in block 450, and the MFD updates the job attributes as the job is scanned and sends out a trap notification to registered devices.

As shown in block 460, the FDI device receives the trap notification and inspects the Job Monitoring MIB for new entries, wherein based on the user login and job programming attributes, it checks to see if the job can be authorized to be printed. If there are sufficient funds to print the worst case job, the FDI device releases the hold on the job through the Job Management MIB. If the actual number of pages in the job needs to be determined, it waits for scanning to complete before authorizing the job. When scanning completes, a trap notification is sent to registered devices by the MFD as shown in block 470. Once complete, the FDI device receives the trap notification and inspects the Job Monitoring MIB for new or changed entries as shown in block 480. If there are sufficient funds to print the job, the job is released through the Job Management MIB and the charge amount for the job is reserved. If more funds need to be added, the job is placed on accounting reserve hold.

The FDI device may begin charging the user for pages delivered based on the sheet delivered signal on the FDI as shown in block 482. When a job queue management operation is received by the MFD through the Job Management MIB, the device acts upon the request accordingly. If the job hold is released, printing begins immediately, possibly before scanning completes. If the job is placed on accounting resource hold, a fault screen is displayed informing the user of the situation. If the job is deleted, the machine cycles down and cancels the pending job as shown in block 490. As printing proceeds, the Job Monitoring MIB is updated with the actual resources used as shown in block 492 and when printing completes, a trap notification is sent to registered devices. The FDI device then receives the trap notification and inspects the Job Monitoring MIB for new or changed entries. If the job has completed, the actual job charge is recorded if necessary as depicted in block 494.

FIG. 5 depicts a flow diagram 500 illustrating the control flow process employed between the user, FDI device, and MFD for a typical scan job in accordance with another embodiment. As shown in block 510, a user first logs into the FDI device. The FDI device then registers with the MFD for job trap notifications and also enables the MFD for usage as shown in block 520. The job programming pathway is displayed on the MFD as shown in block 530. The user programs the job, loads the originals, and presses the start button to initiate the job as shown in block 540. The MFD then creates an entry in the Job Monitoring MIB with the user login and programmed job attributes, and places it on accounting authorization hold as the job is scanned and sends out a trap notification to registered devices as shown in block 550. The MFD updates the job attributes. The FDI device receives the trap notification and inspects the Job Monitoring MIB for new entries. Based on the user login and job programming attributes, it checks to see if the job can be authorized to be processed. If there are sufficient funds to process the worst case job, the FDI device releases the hold on the job through the Job Management MIB. If the actual number of pages in the job needs to be determined, it waits for scanning to complete before authorizing the job as shown in block 560. When scanning completes, a trap notification is sent to registered devices by the MFD as shown in block 570. Once complete, the FDI device receives the trap notification and inspects the Job Monitoring MIB for new or changed entries. If there are sufficient funds to process the job, the job is released through the Job Management MIB and the charge amount for the job is reserved. If more funds need to be added, the job is placed on accounting reserve hold as shown in block 580. When a job queue management operation is received by the MFD through the Job Management MIB, the device acts upon the request accordingly. If the job hold is released, filing/mailing begins immediately, possibly before scanning completes. If the job is placed on accounting resource hold, a fault screen is displayed informing the user of the situation. If the job is deleted, the machine cycles down and cancels the pending job as shown in block 590. As filing proceeds, the Job Monitoring MIB is updated with the actual resources used. When filing completes, a trap notification is sent to registered devices as shown in block 592. The FDI device then receives the trap notification and inspects the Job Monitoring MIB for new or changed entries. If the job has completed, the actual job charge is recorded as depicted in block 594.

FIG. 6 depicts a diagram 600 illustrating the control flow process employed between the user, FDI device, and MFD for a typical print job in accordance with yet another embodiment. As shown in block 610, a user first logs into the FDI device. The FDI device then registers with the MFD for job trap notifications and also enables the MFD for usage as shown in block 620. The job programming pathway is displayed on the MFD as shown in block 630. The user releases the print job either through the local user interface or through the FDI device as shown in block 640. The MFD then creates an entry in the Job Monitoring MIB, and places it on accounting authorization hold as shown in block 650, wherein the MFD updates the job attributes as the job is decomposed and sends out a trap notification to registered devices.

The FDI device receives the trap notification and inspects the Job Monitoring MIB for new entries as shown in block 660, and based on the user login, it checks to see if the job can be authorized to be printed. If there are sufficient funds to begin printing the job, the FDI device releases the hold on the job through the Job Management MIB. If the actual number of pages in the job needs to be determined, it waits for decomposition to complete before authorizing the job. When decomposition completes, a trap notification is sent to registered devices by the MFD as shown in block 670. Once complete, the FDI device receives the trap notification and inspects the Job Monitoring MIB for new or changed entries as shown in block 680. If there are sufficient funds to print the job, the job is released through the Job Management MIB and the charge amount for the job is reserved. If more funds need to be added, the job is placed on accounting reserve hold. The FDI device may then begin charging the user for pages delivered based on the sheet delivered signal, as shown in block 684.

When a job queue management operation is received by the MFD through the Job Management MIB, the device acts upon the request accordingly as shown in block 682, and If the job hold is released, printing begins immediately, possibly before decomposition completes; but if the job is placed on accounting resource hold, a fault screen is displayed informing the user of the situation. The FDI device may then begin charging the user for pages delivered based on the sheet delivered signal, as shown in block 684. If the job is deleted, the machine cycles down and cancels the pending job. As printing proceeds, the Job Monitoring MIB is updated with the actual resources used. When printing completes, a trap notification is sent to registered devices as shown in block 686. The FDI device then receives the trap notification and inspects the Job Monitoring MIB for new or changed entries as depicted in block 688, and if the job has completed, the actual job charge is recorded.

It should only now be appreciated that various of the above disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of employing an extended network interface and system architecture for processing a copy job comprising the steps of:
   operatively connecting a Foreign Device Interface (FDI) device and Multi-Function Device (MFD) via a network-based communication mechanism wherein said network-based communication mechanism utilizes Simple Network Management Protocol (SNMP) Management Information Databases (MIBs);
   configuring the FDI device as a vend card device wherein said FDI device registers with said MFD upon user login to receive trap notifications;
   displaying a job programming pathway upon said MFD to allow programming of attributes of said copy job;

creating an entry into a job monitoring MIB utilizing said MFD upon user initiation of scanning said copy job to create a job request;

sending a trap notification to said FDI device upon completion of scanning and placing said job request on an accounting authorization hold whereupon said FDI device determines if there are sufficient funds available to execute said job request and whether said user is authorized to initiate the job request;

releasing said job request through said job monitoring MIB upon a determination of sufficient funds and that said user is authorized to initiate said job request;

deleting said job request upon a determination that said user is not authorized to initiate said job request;

placing said job request on accounting hold upon a determination of insufficient funds and displaying a fault screen, wherein said job request is released when funds are added;

updating said job monitoring MIB with information related to resources consumed during executing of said job request; and upon completion of said job request, recording an actual job charge to an accounting database utilizing said FDI device.

2. The method of claim 1 wherein said extended network interface is utilized to enforce user account limits by calculating how much a copy job will cost prior to the copy job being processed.

3. The method of claim 1 wherein said SNMP MIBs are configured to provide billing meter and usage meter values and/or job accounting information for copy jobs in progress and copy jobs completed on said MFD to said FDI device.

4. The method of claim 1 wherein said MFD is configured to perform copy, print, scan, and/or fax functions and wherein said network-based communication mechanism utilizes SNMP MIBs.

* * * * *